Jan. 26, 1943 — C. P. BUSHA — 2,309,574
CLOTHESLINE REEL
Filed Aug. 5, 1941 — 2 Sheets-Sheet 1
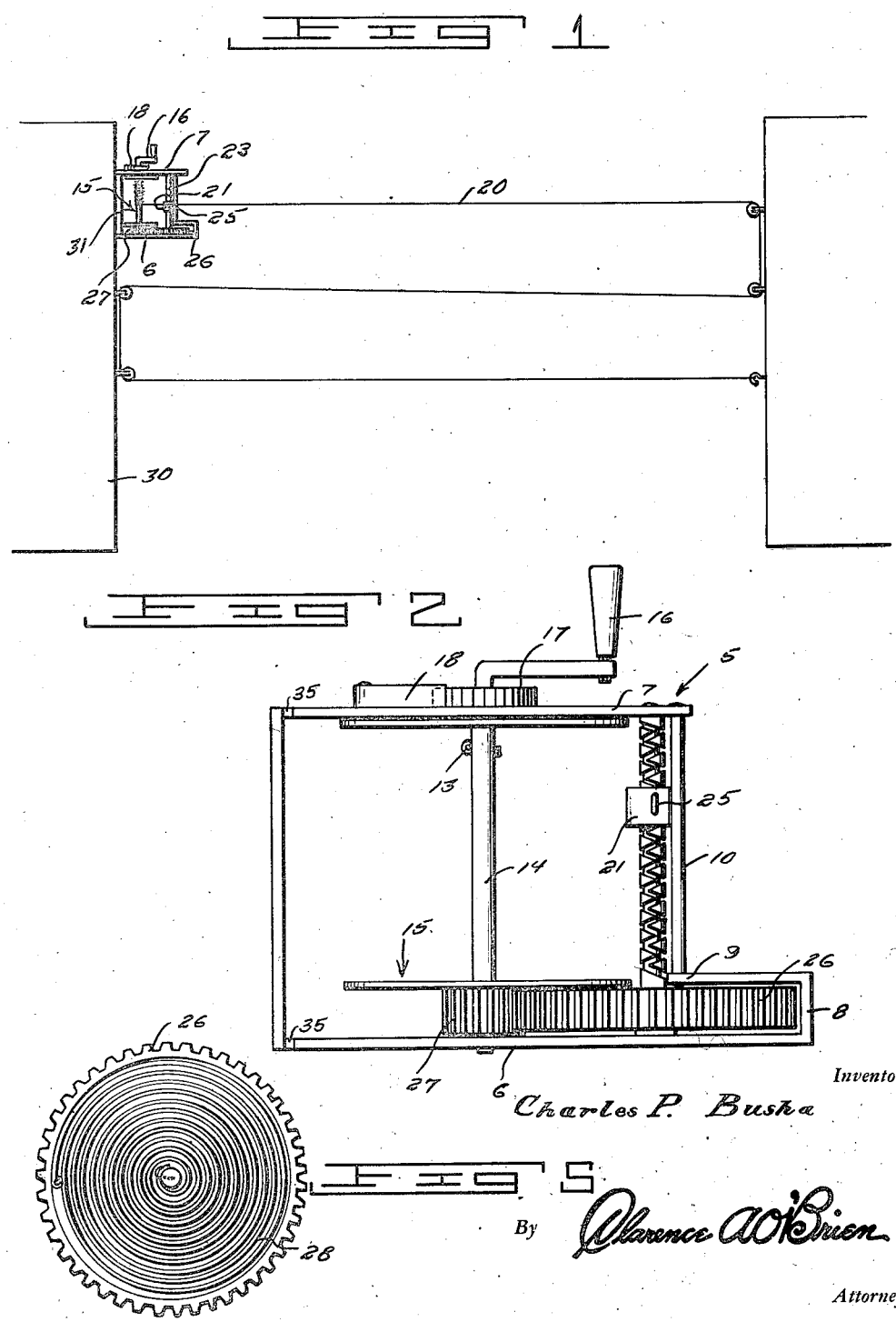
Inventor
Charles P. Busha
By Clarence A. O'Brien
Attorney Jan. 26, 1943     C. P. BUSHA     2,309,574
CLOTHESLINE REEL
Filed Aug. 5, 1941     2 Sheets-Sheet 2
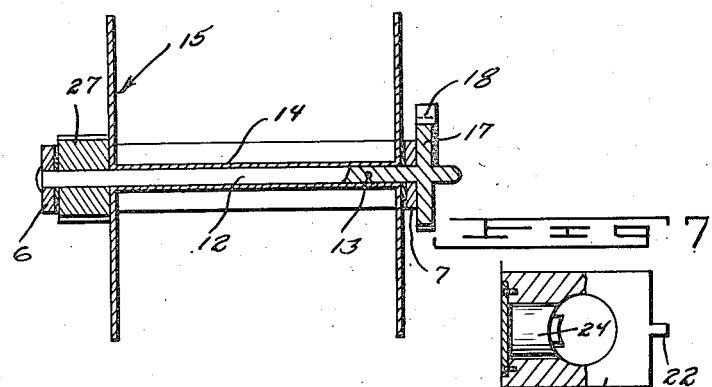
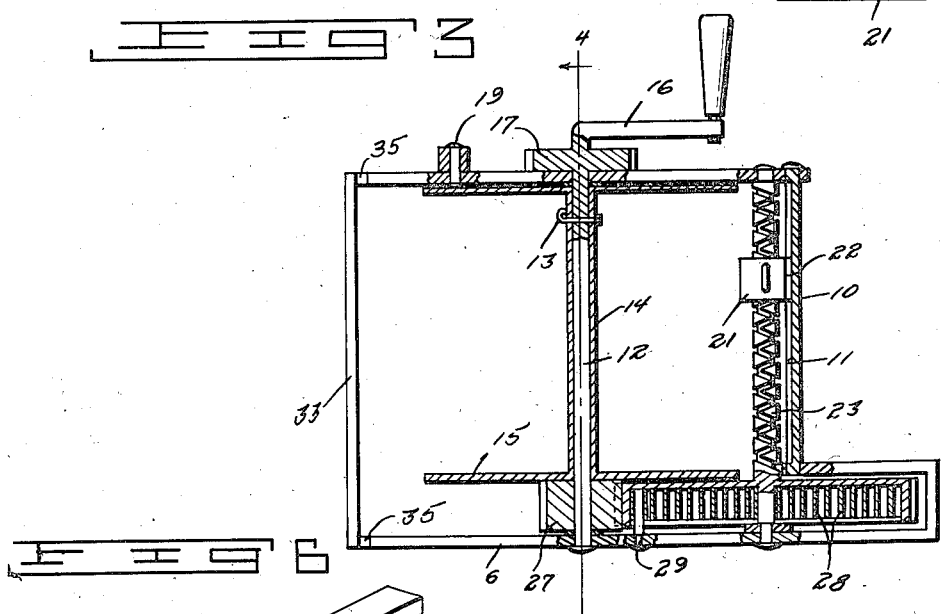
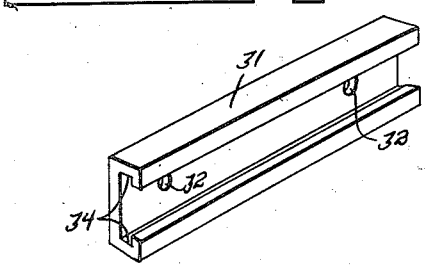
Inventor
Charles P. Busha
By *Clarence A. O'Brien*
Attorney Patented Jan. 26, 1943

2,309,574

UNITED STATES PATENT OFFICE 2,309,574

CLOTHESLINE REEL

Charles Philip Busha, Hibbing, Minn.

Application August 5, 1941, Serial No. 405,551

1 Claim. (Cl. 242—102)

This invention relates to reels, and particularly of the type used in conjunction with clotheslines for holding the line in a taut or stretched condition; and an object of the invention is to improve generally upon such types of reels as are now known and used for this purpose.

The invention together with its objects and advantages will be best understood from a study of the following description taken in connection with the accompanying drawings wherein—

Figure 1 is a top plan view showing a clothesline reel embodying the features of the present invention and illustrating the application of the same.

Figure 2 is a top plan view of the reel.

Figure 3 is a view mostly in horizontal section through the reel.

Figure 4 is a vertical transverse sectional view through the reel.

Figure 5 is an elevational view of a spring-equipped gear wheel.

Figure 6 is a perspective view of an attaching bracket forming part of the invention, and Figure 7 is a view in end elevation, with certain parts broken away and shown in section, of a line guide.

Referring more in detail to the drawings it will be seen that in accordance with the present invention the clothesline reel is characterized by embodying a frame 5 that is substantially U-shaped and has one leg 6 thereof of greater length than the leg 7 and reversely bent as at 8 to have its terminal 9 in substantial alignment with the terminal of the leg 7.

The terminal of the leg 7 and the terminal 9 of the leg 6 are connected together by a member 10 that is provided throughout its length with a groove 11 as and for a purpose hereinafter made manifest.

Rotatably supported between the legs 6 and 7 of the frame 5 is a shaft 12 on which is secured through the medium of an eye-bolt 13 the hub 14 of a flanged reel 15.

On one end thereof the shaft 12 is provided with a crank or handle 16, and at said handle-equipped end, the shaft 12 is also provided with a rack wheel 17 with which is engageable a dog 18 pivoted to the leg 7 as at 19. As is obvious, the dog 18 coacts with the ratchet wheel 17 to releasably secure the reel 15 against rotative movement, and particularly against retrograde movement.

The reel 15 is adapted to have windable thereon the clothesline 20, one end of the clothesline 20 being positively secured to the reel by having the end thereof engaged with the eye of the bolt 13 in a manner believed to be obvious.

To insure a close winding of the line 20 on the reel 15 and a proper distribution of the line between the flanges of the reel 15 during the winding of the line thereon, there is provided a clothesline guide in the form of a block 21 that at one end is provided with a tongue or rib 22 that has a working fit in the groove 11 of the aforementioned member 10, and as clearly shown in Figure 3.

The guide 21 moves longitudinally on a screw 23 rotatably supported between the legs 6 and 7 of the frame 5, and removably positioned within the guide 21 is a follower 24 that coacts with the screw 23 in an obvious manner to cause the member 21 to shift longitudinally of the screw first in one direction, and then in an opposite direction, as the screw 23 revolves.

The spooling guide 21 has mounted thereon a guide loop 25 through which the line 20 is trained for causing a distribution of the line over the reel 15 during the winding thereof.

The line guide 21 is operated in synchronism with the reel 15 through the medium of a gear 26 fixedly provided on one end of the screw 23 and meshing with a pinion 27 secured to the shaft 12 to rotate with the latter. Thus it will be seen that drive from the shaft 12 is transmitted through the gearing 27, 26 to the screw 23 for revolving the latter as the reel 15 rotates incidental to the winding of the line 20 on the reel or the paying out of the line 20 from the reel.

For normally urging the reel 15 to rotate in a direction to cause the line 20 to wind thereon, and consequently serving to maintain the line 20 in a taut condition, there is provided within the confines of the gear 26 a spring 28, and at one end thereof the spring 28 is anchored to the pintle end of the screw 23 while at an opposite end thereof the spring 28 is anchored to the adjacent leg 6 of frame 5 as at 29. (See Fig 3.)

To facilitate mounting the reel on the wall of a building, or other suitable support, fragmentarily suggested in Figure 1 and indicated by the reference numeral 30, there is provided an attaching bracket 31.

The bracket 31 is in the form of a channel plate provided in the web thereof with apertures 32 through the medium of which and suitable fastening elements the bracket 31 is secured to the support 30.

The bight or closed end 33 of the frame 5 is accommodated within the channel 31 and at the top and bottom of the channel the bracket 31 is provided with grooves 34 so that the walls of the channel so engage the part 33 of the frame 5 as to retain the said part of the frame within the bracket 31, the legs 6 and 7 of the bracket being notched at their upper and lower edges as at 35 to coact with the grooved walls 34 of the bracket 31 in an obvious manner.

It is believed that the many advantages of a reel embodying the features of the present invention, especially when used in connection with a clothesline, in a manner suggested in Figure 1, will be appreciated by those skilled in the art without further detailed description.

It will also be understood that while I have herein illustrated and described what is considered the preferred embodiment of the invention, I am well aware that in practical fields of use minor changes may be resorted to from desire or expediency without departing from the spirit of the invention as hereinafter claimed.

Having thus described the invention what is claimed as new is:

In a reel of the character described, a frame, a reel revolubly mounted in the frame, a screw shaft revolubly mounted in the frame parallel with the axis of the reel, a clothesline secured to the reel and adapted to be wound upon and unwound from the reel, a line guide associated with said screw shaft to shift longitudinally thereof and provided with means receiving the line to wind the same uniformly upon the reel when the latter is rotated, a gear on one end of the screw shaft and having a recess in one side, a gear attached to the reel and operatively engaged with the first-named gear, and a spring in the recess of the first-named gear and connected thereto for winding the reel.

CHARLES P. BUSHA.